April 17, 1956 S. M. THOMSEN 2,742,438

METHOD OF PRODUCING CRYSTALS

Filed March 31, 1953

INVENTOR.

SOREN M. THOMSEN

BY J. L. Whittaker

ATTORNEY

United States Patent Office 2,742,438

Patented Apr. 17, 1956

2,742,438

METHOD OF PRODUCING CRYSTALS

Soren M. Thomsen, Pennington, N. J., assignor to Radio Corporation of America, a corporation of Delaware Application March 31, 1953, Serial No. 345,825

6 Claims. (Cl. 252—501)

This invention relates to a method of producing crystals and more particularly to a method of producing cadmium sulphide and cadmium selenide crystals with predetermined electrical properties.

Cadmium sulphide and cadmium selenide crystals can be produced in a variety of ways. One method is to react cadmium metal in gaseous form with a gas containing sulphur or selenium at a temperature below the sublimation temperature of the reaction product, and allowing crystals of the reaction product to grow in the region where the reaction takes place.

Crystals made by any of the known methods appear to be alike. However, when these crystals are examined for electrical properties, their electrical conductivity and photosensitivity is found to vary from crystal to crystal. Electrical conductivity refers to the ability of a crystal to pass on electric current and is used as defined by the AIEE. This conductivity, when measured for an illuminated crystal, is referred to as the light conductivity of the crystal; and, when measured for the same crystal in darkness is referred to as the dark conductivity of the crystal. Photosensitivity, as used in this application, is the ratio of the light conductivity to the dark conductivity.

Since the dark and light conductivities and the photosensitivity vary from one crystal to another, it is desirable to provide a method for producing cadmium sulphide and cadmium selenide crystals that have predetermined conductivities and photosensitivity.

An object of this invention is to provide an improved method for producing crystals of cadmium sulphide and cadmium selenide.

Another object of this invention is to provide a method for producing cadmium sulphide and cadmium selenide crystals having a predetermined electrical conductivity.

Another object of this invention is to provide a method for producing cadmium sulphide and cadmium selenide crystals having a predetermined photosensitivity.

Another object of this invention is to provide a method for reducing the conductivity of cadmium sulphide and cadmium selenide crystals.

Another object of this invention is to provide a method for increasing the photosensitivity of cadmium sulphide and cadmium selenide crystals.

In general, the present method consists of growing cadmium sulphide or cadmium selenide crystals by one of the prior art methods, and then introducing cations, selected from the group consisting of silver and copper, into the lattice of these crystals. This may be accomplished by immersing crystals of cadmium sulphide or cadmium selenide in a medium containing the desired cations. Then, after removal from said medium and drying, diffusing the cations into the crystals.

The novel features of the invention, both as to its organization as well as additional advantages thereof, will be set forth in greater detail in the following description in conjunction with the accompanying drawings, in which:

Figure 1 illustrates the effect of additions of copper upon the electrical conductivity and photosensitivity of a cadmium sulphide crystal. These curves represent what are believed to be average results obtained by treating typical conducting-type cadmium sulphide crystals.

Curve 22 shows how the dark conductivity of the crystal will decline sharply and then level off when the amount of copper in the crystal is increased. Curve 24 shows how the light conductivity of the crystal will decline sharply and then level off when the amount of copper in the crystal is increased. The photosensitivity, or ratio of light conductivity to dark conductivity, is shown by curve 26. Since the sharp breaks in curves 22 and 24 do not occur for the same additions of copper, curve 26 shows a sharp rise and then a sharp decline. Note that conducting crystals treated with small or no amounts of copper remain relatively conducting and exhibit a small photosensitivity. Additions of copper to the lattice of the crystal decreases the conductivity of the crystal but increases the photosensitivity up to an optimum amount P. Further additions of copper decrease the photosensitivity and decrease the conductivity of the crystal further to render the crystal relatively insulating.

The phenomenon described is not clearly understood nor has a completely satisfactory theory been advanced.

Figure 2:
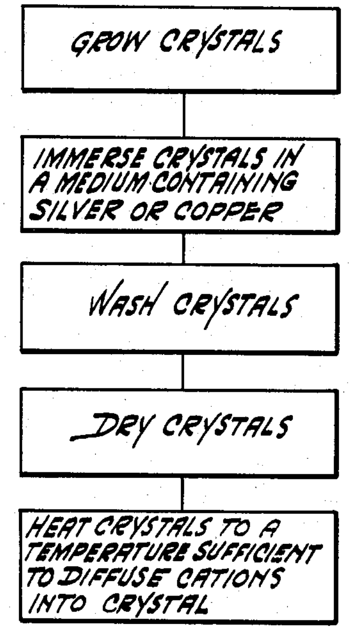
Figure 2 is a schematic diagram illustrating the general method of the present invention.

It can be seen from these curves that, starting with conducting-type cadmium sulphide crystals, additions of a desired amount of copper will yield crystals having predetermined electrical characteristics. In accordance with the present invention a preferred method of introducing silver or copper ions into the lattice of crystals of cadmium sulphide or cadmium selenide is shown schematically in Figure 2. This method includes the step of immersing a weighed amount of crystals in an aqueous solution containing a known amount of copper or silver ions. The copper or silver ions will replace the cadmium ions on the surface of the crystals. When the replacement is complete, the next step is to wash and dry the crystals, and then heat the crystals to a temperature sufficient to diffuse the copper or silver ions into the crystals.

In order to incorporate about 5 parts per million of copper into cadmium sulphide crystals, the following procedure may be used: Immerse 6 grams of cadmium sulphide crystals in 50 milliliters of 0.00001 molar aqueous copper nitrate solution. Agitate the mixture gently for 5 minutes, decant the liquid and wash the crystals twice in triple-distilled water. Dry the crystals in air below 150° C. Fire the crystals at about 700° C. for about 20 minutes in an atmosphere of hydrogen. Cool to a temperature below 150° C. in the same atmosphere before exposing to air. This will yield about 6 grams of cadmium sulphide crystals having about 5 parts per million of copper incorporated in its lattice.

In the above described process, any soluble copper solution of any concentration that will deposit a known amount of copper ions on a known weight of the cadmium sulphide crystals may be used. In the case of incorporating copper or silver into cadmium sulphide crystals, it is preferred to use an aqueous solution of copper or silver nitrate respectively of about $10^{-7}$ to about $10^{-5}$ molar concentration. In the case of incorporating copper into cadmium selenide crystals, it is preferred to use an aqueous solution of copper nitrate of about $10^{-4}$ to about $10^{-2}$ molar concentration.

While hydrogen is given as the atmosphere in which to fire the crystals, inert gases such as nitrogen, helium and argon will work equally well. Certain reducing gases such as hydrogen and hydrogen sulphide are satisfactory. The temperature to which the crystals are heated is not critical. However, the temperature must be high enough to give the copper ions sufficient mobility to diffuse into the crystals, but not so high as to cause the materials to evaporate. About 700° C. is desirable for diffusing copper into cadmium sulphide crystals.

Figure 1:
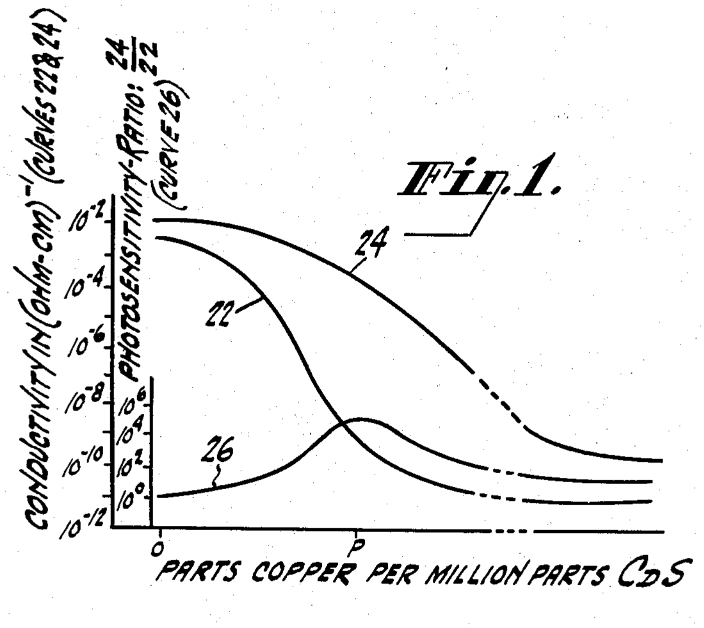
Figure 1 is a graph showing change of electrical conductivity and photosensitivity of a typical cadmium sulphide crystal with the addition of copper to its lattice.

While there has been described a method for incorporating copper into the lattice of cadmium sulphide crystals utilizing the present invention, curves similar to those illustrated in Figure 1 can be obtained for silver incorporated in cadmium sulphide crystals, copper incorporated in cadmium selenide crystals, and silver incorporated in cadmium selenide crystals.

For each of the above mentioned materials, crystals having a conductivity greater than $10^{-3}$ ohm-cm.$^{-1}$ are considered to be conducting-type crystals. This would include cadmium sulphide crystals believed to contain less than two parts of copper or silver per million parts of cadmium suphide. Crystals having a conductivity less than $10^{-10}$ ohm-cm.$^{-1}$ are considered to be insulating-type crystals. This would include cadmium sulphide crystals believed to contain more than 7 parts of copper or silver per million parts of cadmium sulphide. Those crystals that have a conductivity between $10^{-10}$ ohm-cm.$^{-1}$ and $10^{-3}$ ohm-cm.$^{-1}$ have an intermediate conductivity with a high photosensitivity, and would include cadmium sulphide crystals believed to contain 2 to 7 parts of copper or silver per million parts of cadmium sulphide.

What is claimed is:

1. The process of reducing the electrical conductivity of crystals of a material selected from the group consisting of cadmium sulphide and cadmium selenide which comprises immersing said crystals in an aqueous solution containing cations selected from the group consisting of copper and silver, and heating said crystals to a temperature sufficient to diffuse said cations into said crystal.

2. The process of reducing the electrical conductivity of crystals of a material selected from the group consisting of cadmium sulphide and cadmium selenide which comprises immersing said crystals in an aqueous solution containing cations selected from the group consisting of copper and silver; washing said crystals; drying said crystals; and heating said crystals to about 700° C. in a non-oxidizing atmosphere until said cations are diffused into said crystals.

3. The process of reducing the electrical conductivity of crystals of materials selected from the group consisting of cadmium sulphide and cadmium selenide which comprises immersing said crystals in an aqueous solution containing cations selected from the group consisting of copper and silver; washing said crystals; drying said crystals; and heating said crystals to about 700° C. in an atmosphere of hydrogen until said cations are diffused into said crystals.

4. The process of reducing the electrical conductivity of crystals of cadmium sulphide which comprises immersing said crystals in an aqueous solution of copper nitrate of about $10^{-7}$ to about $10^{-5}$ molar concentration; washing said crystals; drying said crystals at about 150° C.; and heating said crystals at about 700° C. in an atmosphere of hydrogen until said cations are diffused into said crystals.

5. The process of reducing the electrical conductivity of crystals of cadmium sulphide which comprises immersing said crystals in an aqueous solution of silver nitrate of about $10^{-7}$ to about $10^{-5}$ molar concentration; washing said crystals; drying said crystals at about 150° C.; and heating said crystals at about 700° C. in an atmosphere of hydrogen until said cations are diffused into said crystals.

6. The process of reducing the electrical conductivity of crystals of cadmium selenide which comprises immersing said crystals in an aqueous solution of copper nitrate of about $10^{-4}$ to about $10^{-2}$ molar concentration; washing said crystals; drying said crystals at about 150° C.; and heating said crystals at about 700° C. in an atmosphere of hydrogen until said cations are diffused into said crystals.

References Cited in the file of this patent

UNITED STATES PATENTS

| | | |
|---|---|---|
| 2,623,858 | Kroger | Dec. 30, 1952 |
| 2,651,700 | Gans | Sept. 8, 1953 |
| 2,706,792 | Jacobs | Apr. 19, 1955 |

OTHER REFERENCES

Academic des Sciences Comptes Rendus, vol. 230, pages 947–949, March 1950; article by Veith. (Copy in Scientific Library.)

Leverenz: "Luminescence of Solids," page 394; John Wiley and Sons Inc. (1950). (Copy in Scientific Library.)